(12) United States Patent
Dunn et al.

(10) Patent No.: US 10,386,060 B2
(45) Date of Patent: Aug. 20, 2019

(54) ILLUMINATED THRESHOLD BARRIER

(71) Applicant: MUNCHKIN, INC., Van Nuys, CA (US)

(72) Inventors: Steven Bryan Dunn, Beverly Hills, CA (US); Quinn Michael Biesinger, Los Angeles, CA (US); Thomas Birkert, West Hills, CA (US)

(73) Assignee: Munchkin, Inc., Van Nuys, CA (US)

( * ) Notice: Subject to any disclaimer, the term of this patent is extended or adjusted under 35 U.S.C. 154(b) by 88 days.

(21) Appl. No.: 15/053,326

(22) Filed: Feb. 25, 2016

(65) Prior Publication Data
US 2016/0245501 A1  Aug. 25, 2016

Related U.S. Application Data

(60) Provisional application No. 62/120,802, filed on Feb. 25, 2015.

(51) Int. Cl.
| | |
|---|---|
| *F21V 33/00* | (2006.01) |
| *E06B 9/02* | (2006.01) |
| *F21V 23/04* | (2006.01) |
| *F21Y 115/10* | (2016.01) |
| *E06B 9/00* | (2006.01) |

(52) U.S. Cl.
CPC ............ *F21V 33/0004* (2013.01); *E06B 9/02* (2013.01); *E06B 2009/002* (2013.01); *F21V 23/0464* (2013.01); *F21V 23/0471* (2013.01); *F21Y 2115/10* (2016.08)

(58) Field of Classification Search
CPC ..... E06B 2009/0002; E06B 2009/6818; E06B 2009/6827; E06B 2009/6836; F21V 23/0471; F21V 33/0004

USPC ......... 362/127, 217.01, 217.14, 225, 249.01, 362/249.02, 555
See application file for complete search history.

(56) References Cited

U.S. PATENT DOCUMENTS

| 6,691,467 B2 | 2/2004 | Hincher, Sr. |
| 7,318,298 B2 | 1/2008 | Marsden et al. |
| (Continued) | | |

OTHER PUBLICATIONS

International Search Report, dated May 3, 2016, (pp. 1-3).
(Continued)

*Primary Examiner* — Sean P Gramling
*Assistant Examiner* — Keith G. Delahoussaye
(74) *Attorney, Agent, or Firm* — Robert Z. Evora, Esq.

(57) ABSTRACT

A threshold barrier assembly includes an illumination system to facilitate visibility of the barrier assembly while mounted in a doorway or on a staircase, thereby reducing the risk of a trip hazard. The barrier assembly can include a frame comprising a pair of upright frame members connected to a lower cross member, and a barrier door comprising an upper horizontal cross member pivotally connected to the frame, a lower horizontal cross member, and vertical members connected between the upper and lower horizontal cross members. At least one illumination element is installed in at least one of the lower cross member, the upper horizontal cross member, or one or more of the vertical members. An integrated controller can control illumination of the illumination system based on a predetermined sequence, or detected environmental or operating conditions.

20 Claims, 15 Drawing Sheets

(56) References Cited

U.S. PATENT DOCUMENTS

| | | | | |
|---|---|---|---|---|
| 7,339,488 B2* | 3/2008 | Pennington | ............... | G08B 5/36 |
| | | | | 340/628 |
| 7,438,434 B2* | 10/2008 | Prince, Jr. | ............. | F21V 33/006 |
| | | | | 362/145 |
| 8,341,886 B2 | 1/2013 | Yates | | |
| 8,468,743 B2 | 6/2013 | Ting et al. | | |
| 8,615,931 B2 | 12/2013 | Dunn | | |
| 2006/0092378 A1* | 5/2006 | Marsden | ................. | E06B 9/04 |
| | | | | 352/221 |
| 2007/0279898 A1* | 12/2007 | Sheridan | ................ | E04F 11/18 |
| | | | | 362/152 |
| 2010/0277898 A1* | 11/2010 | Murray | ................ | B60Q 1/323 |
| | | | | 362/146 |
| 2012/0280528 A1* | 11/2012 | Dellock | .................. | B60R 1/06 |
| | | | | 296/1.08 |
| 2013/0086840 A1* | 4/2013 | Marsden | ................ | E05B 41/00 |
| | | | | 49/13 |
| 2013/0125470 A1* | 5/2013 | Dunn | ....................... | E06B 9/04 |
| | | | | 49/381 |

OTHER PUBLICATIONS

Written Opinion for PCT/US2016/019589, dated May 3, 2016, (pp. 1-5).

European Patent Office Search Report and Search Opinion for PCT/US2016019589, dated Oct. 8, 2018. (pp. 8).

* cited by examiner

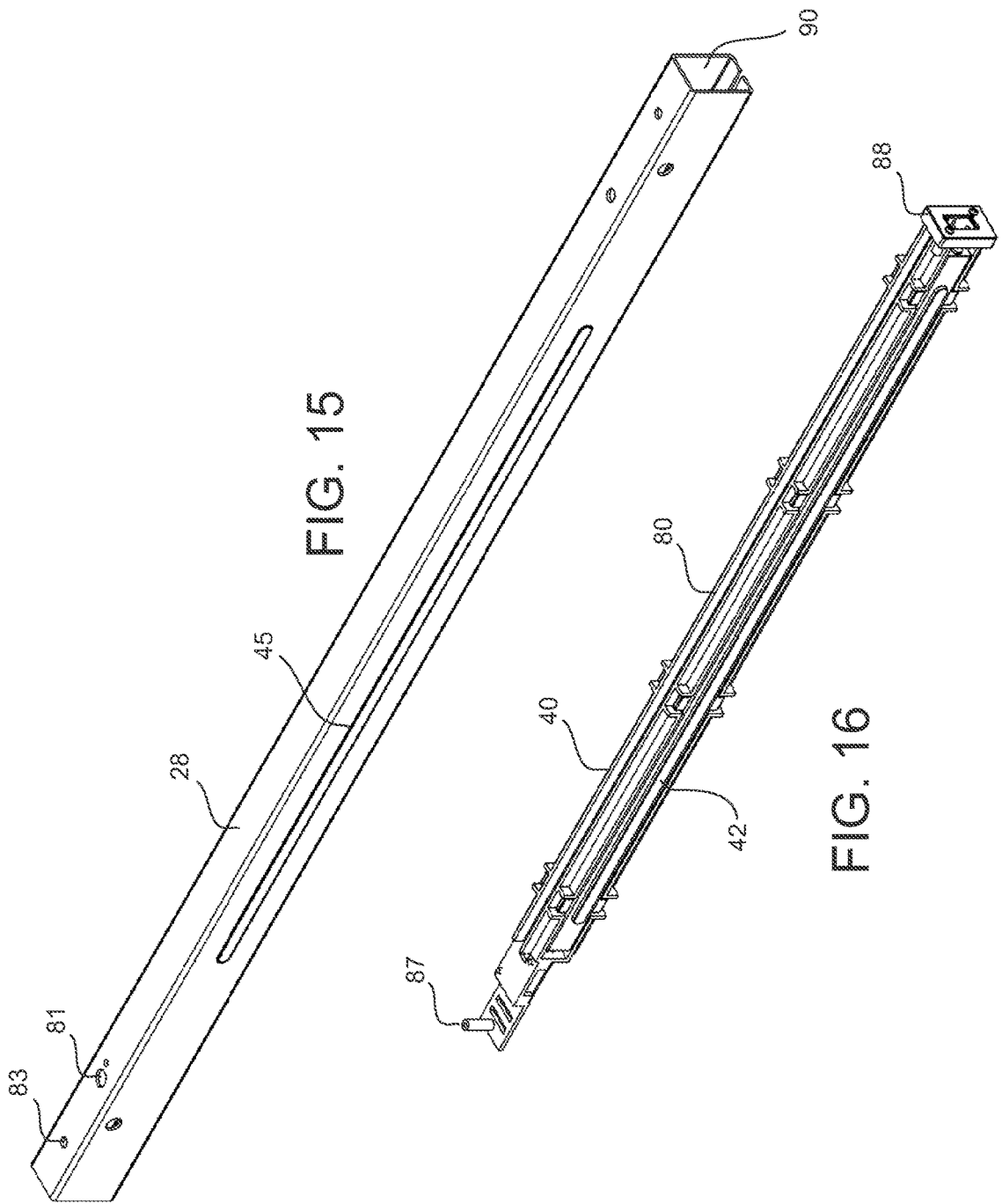

ILLUMINATED THRESHOLD BARRIER

CROSS REFERENCE TO RELATED APPLICATION

The application claims priority to U.S. Provisional Patent Application Ser. No. 62/120,802, filed Feb. 25, 2015, the contents of which are hereby incorporated by reference herein in its entirety into this disclosure.

TECHNICAL FIELD

The subject disclosure relates to a barrier assembly and, more particularly, to a safety gate assembly having an illumination source provided in at least one of the frame members to eliminate dangerous tripping hazards.

BACKGROUND

U-shaped frame gate assemblies are often used in homes to block a child or a pet from an area, room, or staircase. Such gate assemblies install quickly between two opposing surfaces of a doorframe or other opposing structures, and can be secured without the need to install unsightly permanent hardware into the opening of the doorframe, which can cause unnecessary damage to the doorframe.

However, conventional U-shaped gate assemblies may introduce the unsafe potential for a passerby to trip on or collide with the gate. For example, the lower frame member of the gate assembly that extends across the threshold of a doorway is obtrusive and inconspicuously projects upward from the floor, creating a dangerous hazard to persons passing through the open gate. This problem is compounded at night and/or in low lit areas where a gate is installed, since reduced visibility increasing the chances of a trip hazard.

Although various solutions have been proposed, none available has effectively solved this dangerous problem.

SUMMARY

The following presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. The sole purpose of the subject summary is to present some concepts in a simplified form as a prelude to the more detailed description that is presented hereinafter.

One or more embodiments of the subject disclosure provide for a low-profile barrier assembly and method of installation. The low-profile barrier provides a barrier door located in an opening defined by a frame having a pair of upright frame members connected to a lower cross member. In an un-installed position, the lower cross member has a curvature biasing the upwardly extending arms outward. In an installed position, the curvature of the lower cross member is compressed to zero so that the lower cross member lays flat against a lower surface.

To reduce the risk of a trip hazard, one or more illumination elements are installed in one of the structural members and activated by internal electronics. In one or more embodiments, the illumination elements may be installed in the lower cross member and oriented to direct the light outward from the cross member on the front and rear side, or upward from a top surface of the lower cross member. In other embodiments, the illumination sources may be installed on an upper barrier member of the gate, and oriented to direct the light from the source downward and outward. In still other embodiments, the illumination sources may be installed on one or more vertical barrier members of the gate. The illumination elements are controlled by a control circuit and associated sensing devices. In one or more embodiments, the color and/or pattern of illumination can be controlled to reflect a condition detected by the sensing devices, including but not limited to object detection, an ambient darkness level condition, or other such conditions.

While various aspects, features, or advantages of the subject disclosure are illustrated in reference to safety gates, such aspects and features also can be exploited in various other barrier configurations.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

BRIEF DESCRIPTION OF DRAWINGS

FIG. 15 is a perspective view of an outer housing of a lower cross member.

FIG. 16 is a perspective view of an assembly that fits inside the lower cross member and include illumination elements.

DETAILED DESCRIPTION

Figure 1:
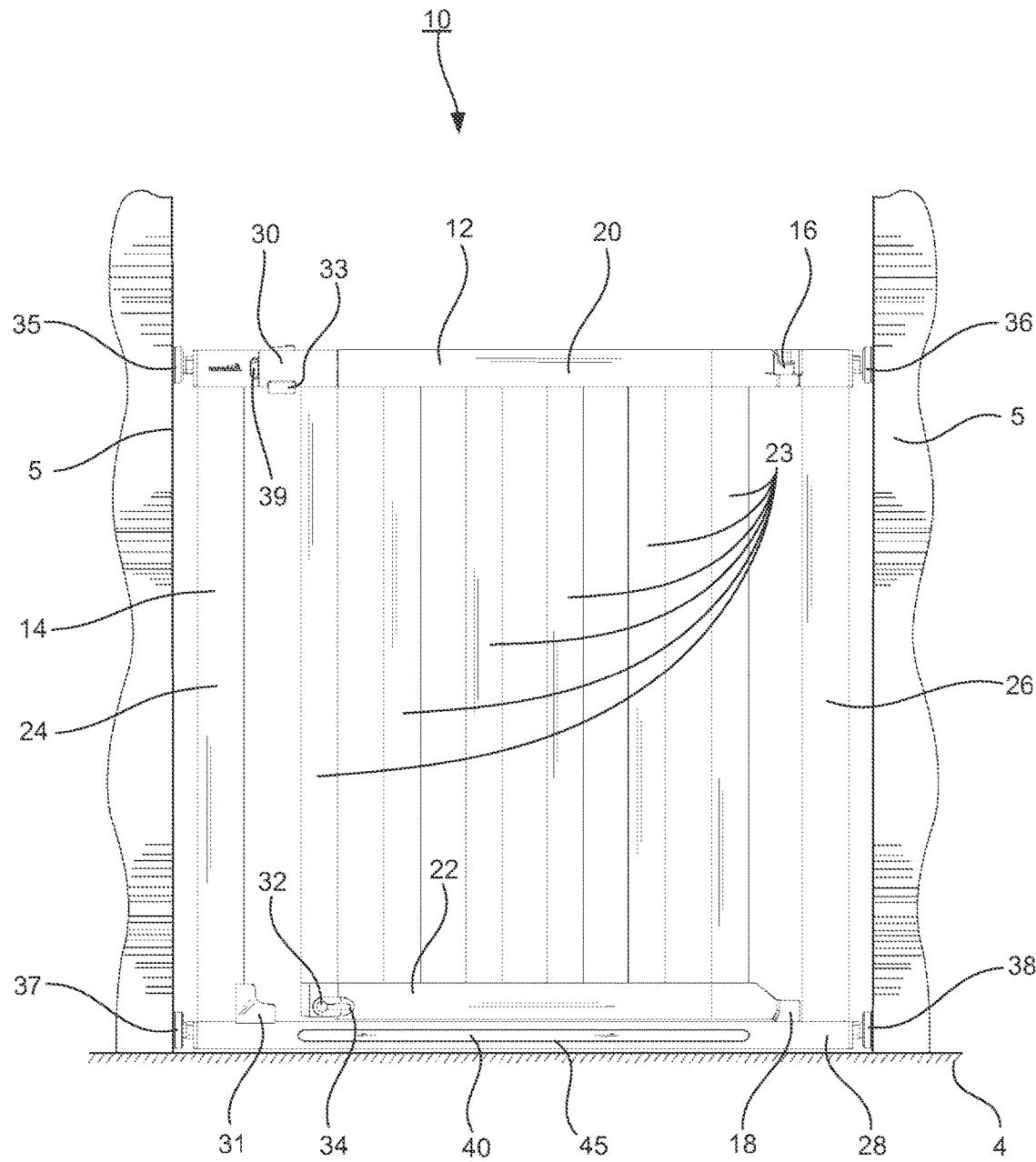
FIG. 1 is a front view of an example illuminated barrier in accordance with aspects described herein.

The subject disclosure is described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details.

FIG. 1 illustrates an exemplary illuminated barrier 10 or gate in an installed position. The illuminated barrier can be installed between two opposing surfaces 5, such as opposing vertical surfaces of a doorframe. The illuminated barrier 10 includes a barrier door 12 pivotally attached to a frame 14. The frame 14 is substantially U-shaped and includes a pair of upwardly extending frame members or arms 24, 26 attached to a lower cross member 28 that is supported by a lower surface. The lower cross member 28 is sufficiently rigid and expands along the ground between the arms 24 and 26. The barrier door 12 is pivotally attached at one end to the arm 26 and swings over the lower cross member 28. Although the example depicted in FIG. 1 (and elsewhere in the drawings) depict a frame comprising two upwardly extending arms 24, 26, some embodiments may only include one upwardly extending arm on a left or right side of the frame.

The illuminated barrier 10 is pressure fit between the opposing surfaces 5. Prior to installation, the arms 24, 26 are slightly angled outward. During installation, a force is provided to bend the arms 24, 26 inward such that the arms extend upward perpendicular from the lower cross member 28. The barrier securing force is a friction force that wedges the illuminated barrier 10 between the surfaces 5 of the doorframe (or other structure) to prevent children and/or animals from passing through the illuminated barrier 10.

The barrier door 12 includes at least an upper cross member 20 and a lower barrier member 22 connected to each other by a plurality of vertical barrier members 23. The plurality of vertical barrier members 23 may be selected from a width that is sized and shaped to substantially fill a passageway to be obstructed by the illuminated barrier 10.

The barrier door 12 is pivotally attached to the frame 14 by an upper hinge 16 and a lower hinge 18 and pivots along a pivot axis. That is, the door 12 pivots relative to the frame 14 on an upper hinge 16 and a lower hinge 18, from a closed position to an open position. The top of the upright frame member 26 may be adapted to receive the upper hinge 16, and the bottom of the upright frame member arm 26 may be adapted to receive the lower hinge 18. As such, the barrier door 12 is capable of pivoting about the pivot axis through the hinges 16, 18 lying in a plane adjacent to the upright frame member arm 26.

The frame 14 of the illuminated barrier 10 is substantially U-shaped and is comprised of the pair of upright frame members 24, 26, or arms, connected to the lower cross member 28. A gusset member 31 may be provided along the frame 14 to house various components of the electronic circuitry for an illumination source, as will be described in more detail later. Alternatively, the electronic circuitry can be housed within one of the pair of upright frame members 24, 26.

A locking handle 30 may be provided with a barrier latch element or latching mechanism 33 at the barrier end of the barrier 10. Likewise, the locking handle 30 may include at the frame end, a frame catch or a mating latch element or receiving mating catch mechanism 39 mounted adjacent to the upper barrier member 20 on an end opposite the upper hinge 16. The mating catch mechanism 39, or retainer, including a catch may be disposed at the upper end of the upright frame member 24 in alignment with the locking handle 30. The catch mechanism 39 is adapted to mate, and interlock with the latching mechanism of the locking handle 30. Locking and unlocking of the latching mechanism to allow egress and ingress through the illuminated barrier 10 may be performed in a number of different ways, such as by movement of a depressible button on the locking handle 30 to allow the barrier door 12 to be moved between an open and closed position.

An optional latch 32 may be fastened to the bottom of the barrier door 12, such as on the lower barrier member 22 in order to latch the lower part of barrier door 12 to the lower cross member 28 or other fixed location on the frame 12. In one exemplary embodiment, the latch 32 may include a latching arm 34 that is pivotally movable between a latched and unlatched position. In the unlatched position, the latching arm 34 is spaced a distance apart from the lower cross member 28 (such as in a horizontal position) as shown in FIG. 1. In a latched position, the latching arm 34 is pivotally moved into engagement against the lower cross member 28 (such as in a vertical position).

It is to be understood that the opposing surfaces 5 and lower surface 4 may define any type of opening through which passage is to be blocked. For example, the opposing surfaces 5 may be sides of a doorway, walls of a hallway, walls of railings of a stairwell and/or any other opening having substantially opposing surfaces between which adjustable helical clamps can be pressure mounted, yielding a sturdy friction fit. Likewise, the lower surface 4 of the opening may be a hallway floor, a step on a staircase and/or any other suitable lower surface location where the illuminated barrier 10 may be installed. The illuminated barrier 10 may be installed on a staircase of a type that other conventional barrier systems cannot be securely installed. The width of the illuminated barrier 10 assembly is sufficiently narrow to allow convenient and easy installation on a single step of a staircase in a low-profile manner, reducing the risk of tripping down the stairs.

Adjustable fasteners 35, 36, 37, 38 are provided at the corners of the illuminated barrier 10. In use, the adjustable fasteners 35, 36, 37, 38 are axially extended outward against the opposing surfaces 5. As the upper adjustable fasteners 35 and 36 are extended outward against the opposing surfaces 5, the upper ends of the upright frame members 24, 26 are pushed inward toward a vertical position. As increasing tension is applied, the angles of the upright frame members 24, 26 are brought to a substantially vertical position that is approximately parallel to the opposing surfaces 5.

The illuminated barrier 10 is sized to substantially block the passageway when the illuminated barrier 10 is completely installed, preventing small children, animals, and various objects from passing through.

The illuminated barrier 10 has an illumination system 40 embedded within for illuminating dark areas surrounding the barrier 10, and providing other indicators related to the barrier 10. Providing light around the barrier 10 promotes safety around otherwise dangerous trip hazards. The light provided by the illumination system 40 can be particularly helpful in scenarios in which a person moves around the barrier 10 when there is little or no light in the surrounding area of a dark doorway or the like.

Figure 2:
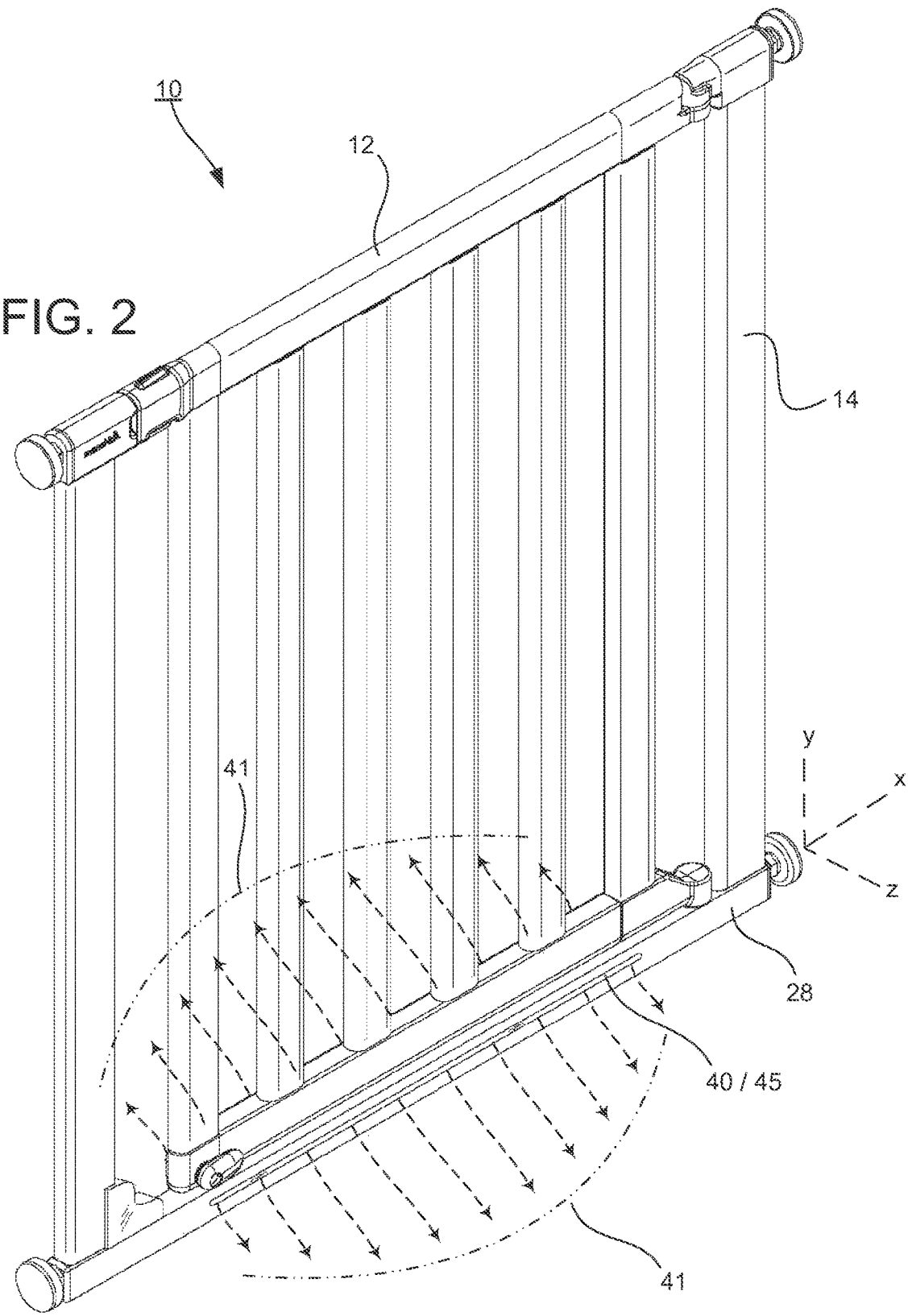
FIG. 2 is a perspective view of the illuminated barrier and an example illumination path emanating outward along the floor from the lower cross member.

FIG. 2 is a view of an embodiment in which the illumination system 40 is integrated within the lower cross member 28 of the barrier 10. Light flow path 41 (illustrated in dashed arrows) patterns show the light from the illumination system 40 radiating outward and away from the lower cross member 28 in front of, and behind, the length of the lower cross member 28. Light produced by the illumination system 40 allows a user to see the barrier 10 in dark, low visibility environments. The light also allows a user to see at least a portion of the path surrounding the lower cross member 28 of the barrier 10. By allowing the user to visually register the position of the lower cross member 28, the illumination system 40 can prevent the user from inadvertently stumbling over the lower cross member or the surrounding environment.

Figure 3:
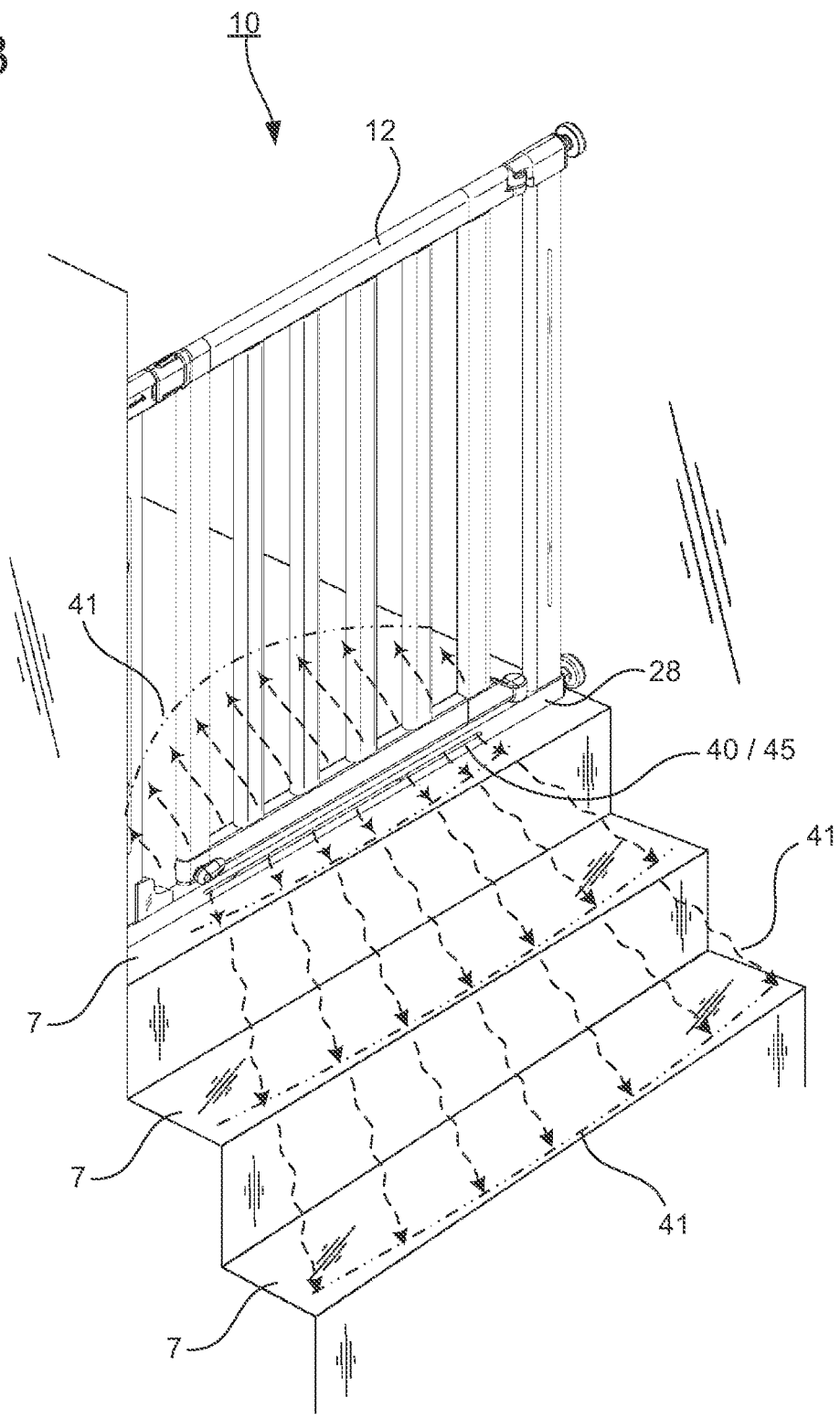
FIG. 3 is a perspective view of the illuminated barrier positioned at a top of a staircase, and an example illumination path emanating outward along the floor in a first direction and outward over stain in the staircase.

FIG. 3 depicts another illustration of the illuminated barrier 10 installed at the top of a staircase 7. In this location, the light flow path 41 from the illumination system 40 radiates outward from the lower cross member 28 in a first direction onto the floor at the top of the steps, and outward and away from a second, opposite direction from the lower cross member 28 over the various steps of staircase 7. In the second direction, the light flow path 41 illuminates the steps of staircase 7 leading up to the illuminated barrier 10. In this manner, the tripping danger on the stairway may be reduced or eliminated by the illuminated barrier 10, as the light produced by the illuminated barrier 10 allows a user walking up the staircase to see the steps of staircase 7 leading up to the illuminated barrier 10.

Figure 4:
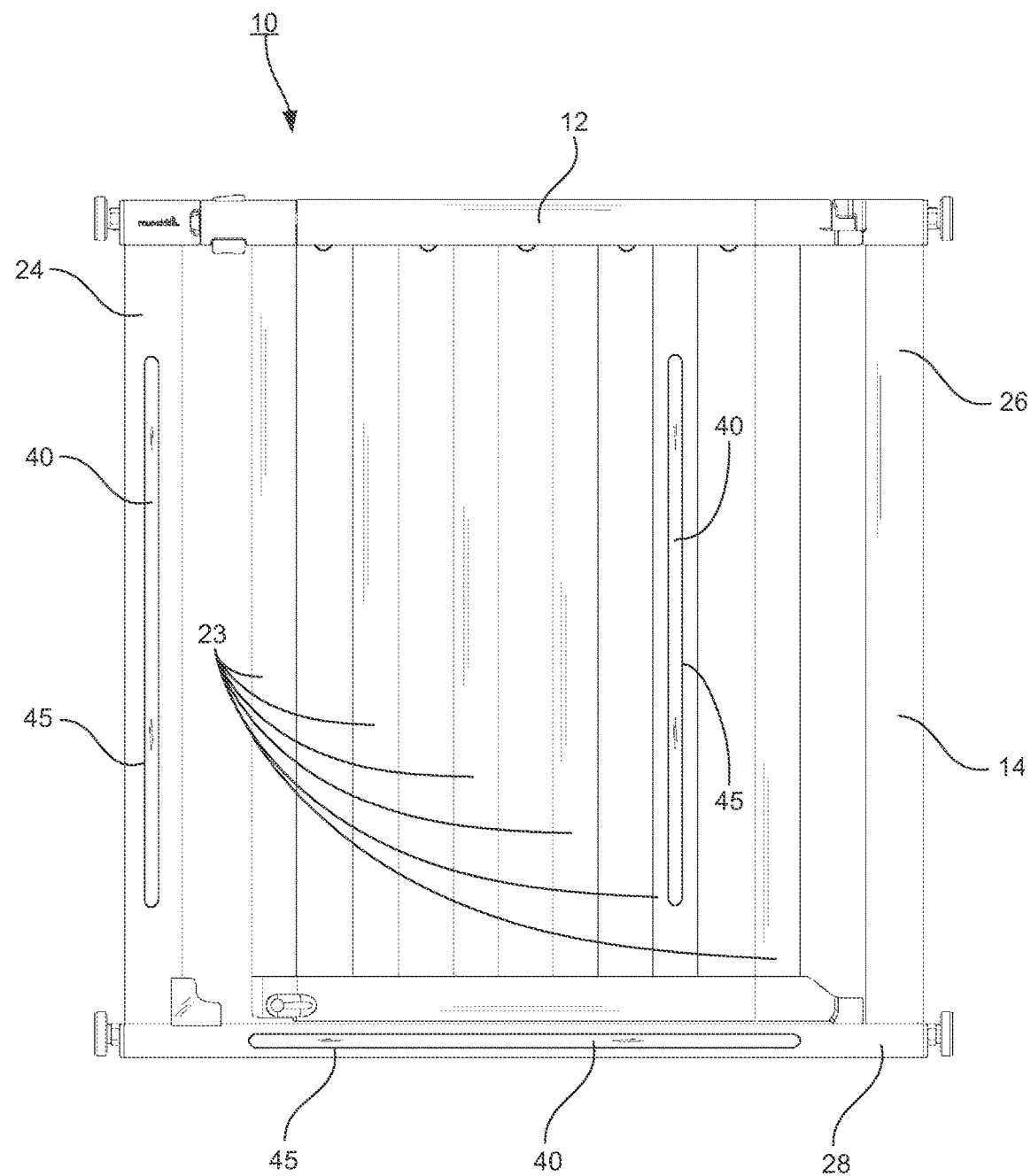
FIG. 4 is a front view of the illuminated barrier having illumination sources disposed in various locations in the illuminated barrier.
Figure 5:
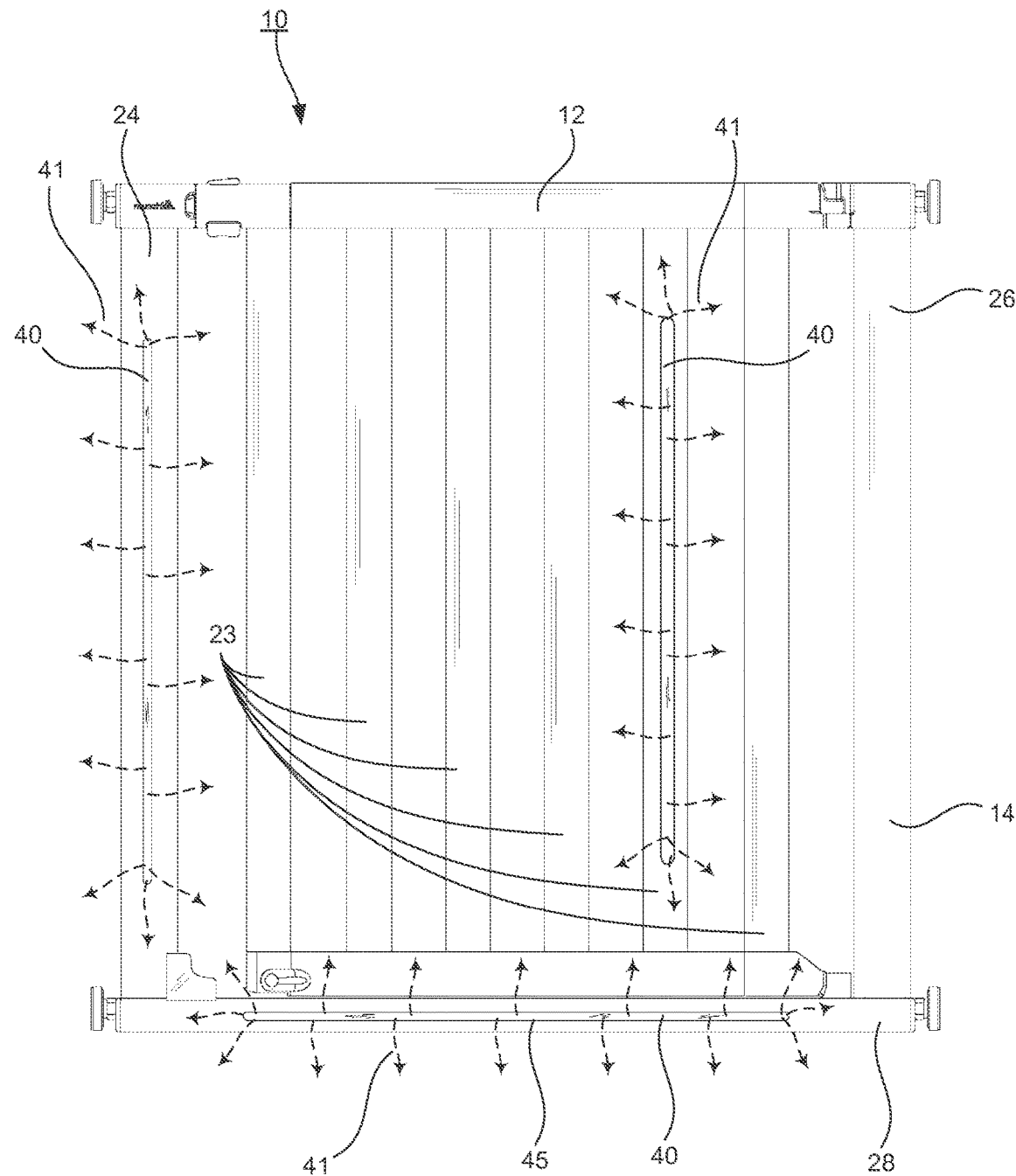
FIG. 5 is a front view of the illuminated barrier having illumination sources disposed at different locations on the illuminated barrier.

FIGS. 4-5 are views depicting various alternative positions where the illumination system 40 may be located within the illuminated barrier 10. FIG. 4 depicts an embodiment in which, in addition to being positioned within the lower cross member 28, the illumination system 40 includes illumination sources positioned within the frame 14, such as within the upwardly extending arms 24 and/or 26. Additionally or alternatively, the illumination sources of illumination system 40 may be positioned in at least one of the vertical barrier members 23. An electronic control unit embodied in a circuit 50 (as will be discussed in more detail later) may be positioned adjacent at least one of the illumination sources of illumination system 40, in an adjacent housing located near to at least one of the illumination sources, or elsewhere within the barrier 10.

Referring to FIG. 5, the light flow path 41 (illustrated in dashed arrows) patterns show the light from the illumination system 40 radiating outward and away from the lower cross member 28, the arm 24 and the vertical barrier member 23. As a result of the illumination produced by illumination system 40, a user approaching the illuminated barrier 10 on a trajectory to cross the threshold of the barrier 10 can see the path, the barrier 10, and the opening surrounding the lower cross member 28 of the barrier 10.

Figure 6:
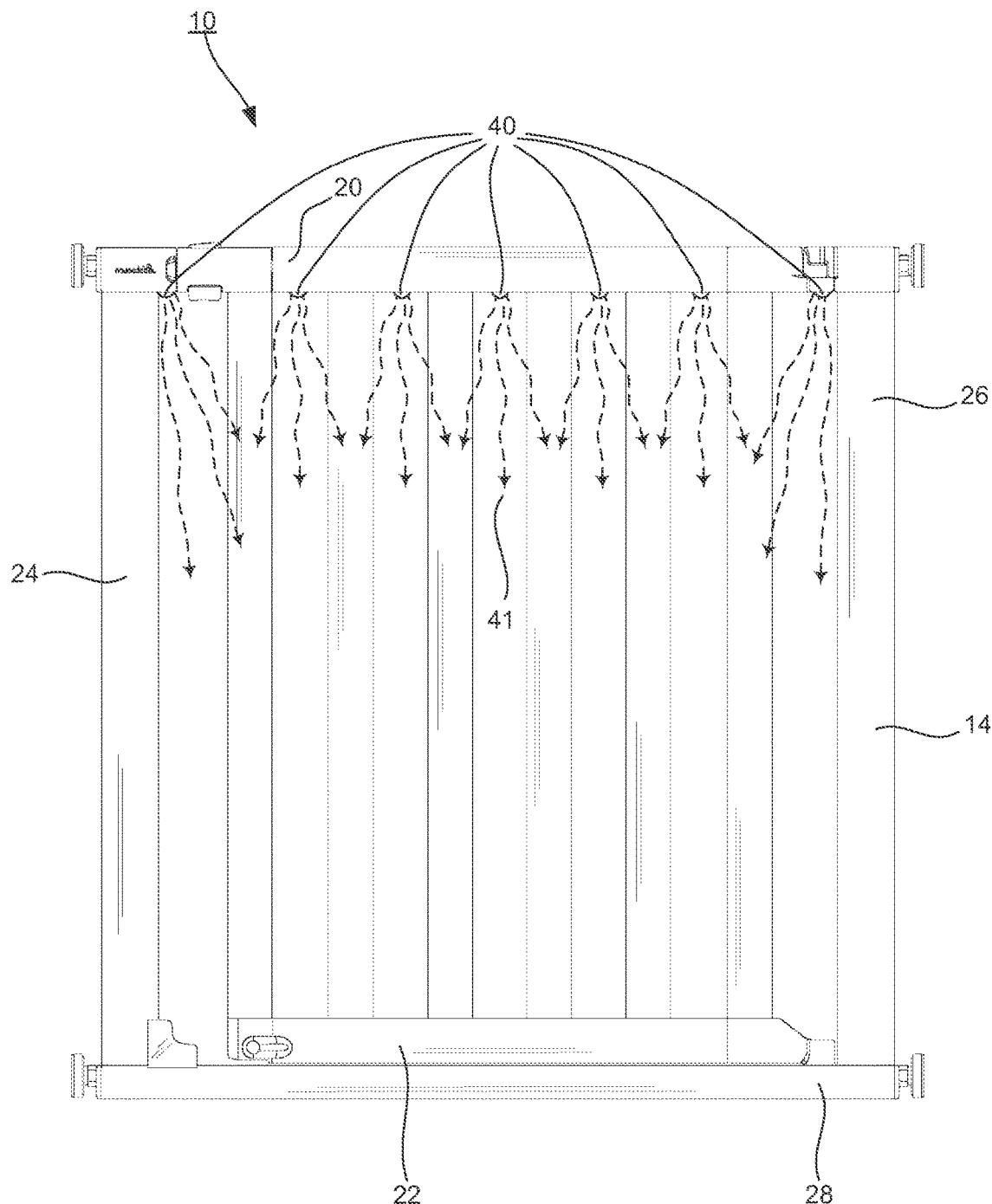
FIG. 6 is a front view of an illuminated barrier having an illumination source that emits light downward from an upper horizontal cross member in the illuminated barrier.
Figure 7:
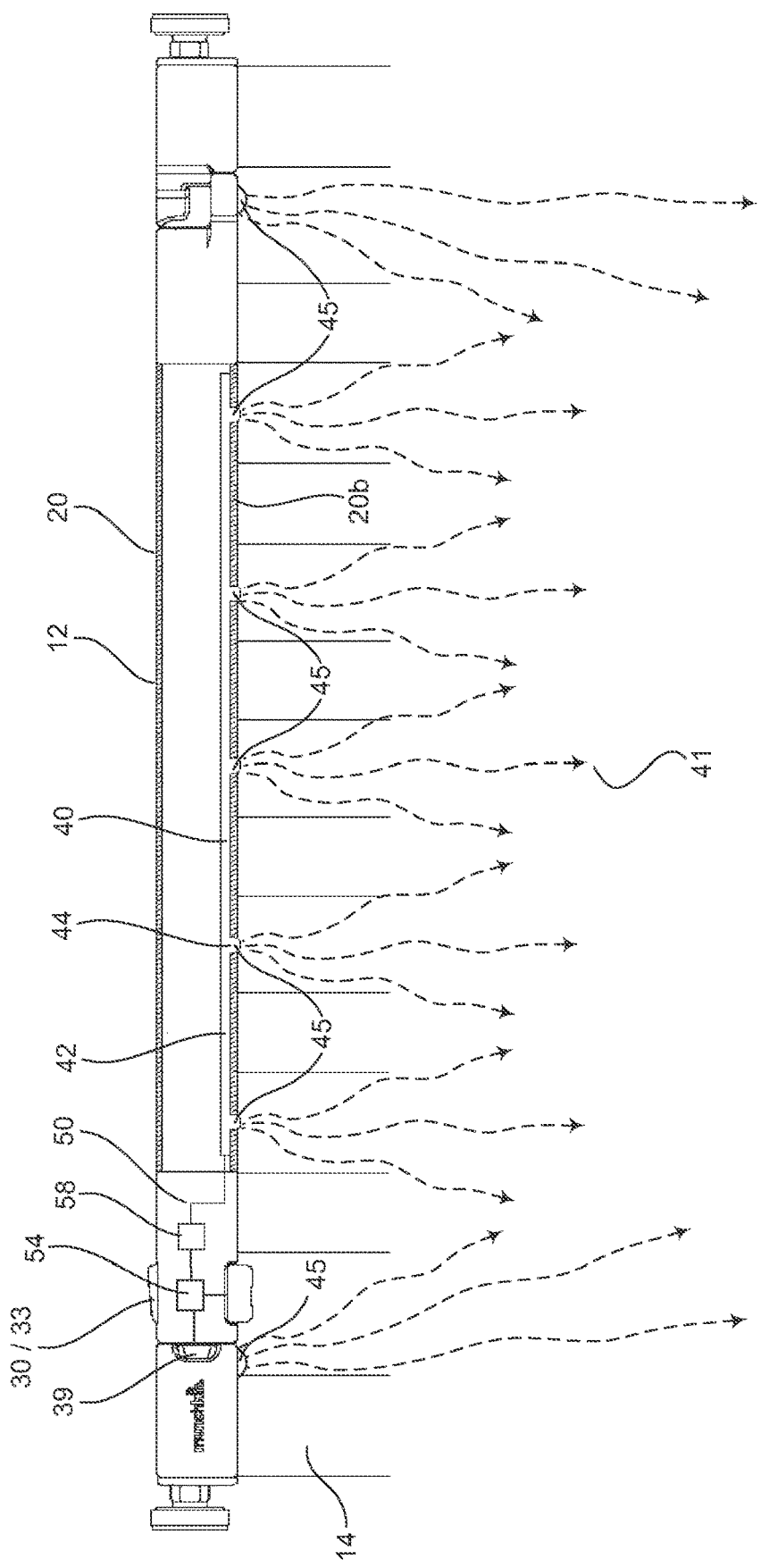
FIG. 7 is close-up view of the upper horizontal cross member having an illumination source installed therein.

FIGS. 6-7 are views illustrating another example embodiment in which the illumination system 40 is positioned on the downward-facing surface of the upper barrier member 20. In this orientation, the light flow path 41 (illustrated in dashed arrows) pattern is directed downward from the upper barrier member 20 toward the lower cross member 28 and surrounding area of the barrier 10, thereby illuminating the vertical members and the lower cross member 28.

As shown in FIG. 7, which is a close-up view of the upper barrier member 20, the illumination system 40 includes an elongated illumination element 42 that acts as a light conductor. In one or more embodiments, the elongated illumination element 42 is disposed within the upper barrier member 20 and mounted to the downward-facing surface of the upper barrier member 20. The elongated illumination element 42 may have formed thereon a number of bulb elements 44 spaced at intervals across the length of the illumination element 425. The bulb elements 44 project downward through apertures 45 disposed in the downward-facing surface 20b of the upper barrier member 20, each of the apertures 45 being located between an adjacent pair of vertical barrier members 23. During operation, the elongated illumination element 42 is powered on by a control unit (that will be discussed in more detail later), causing light to emanate from the bulb elements 44 in a downward direction from the upper barrier member 20.

Figure 8:
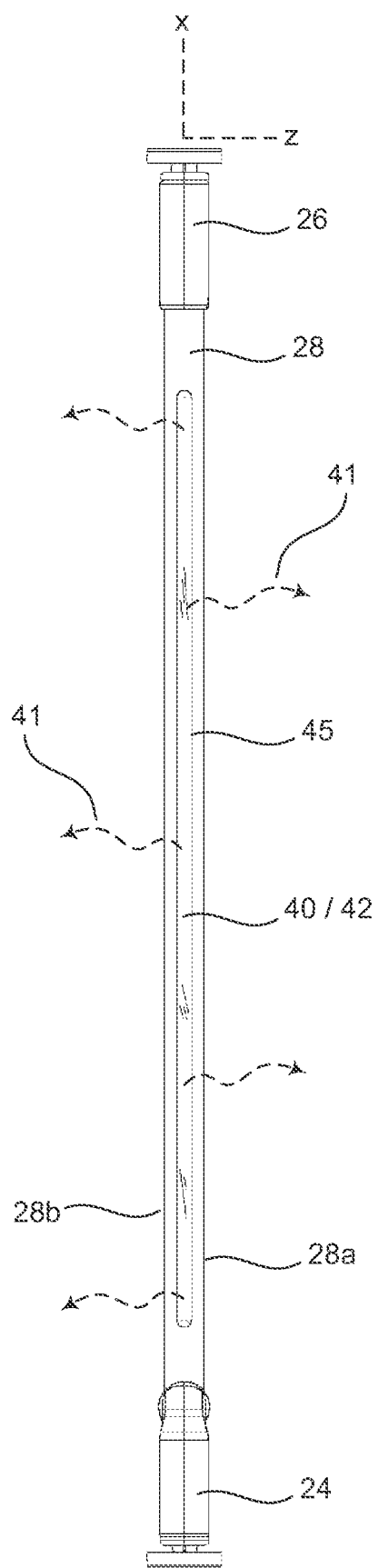
FIG. 8 is a top view of a lower cross member of having an illumination source installed thereon.
Figure 9:
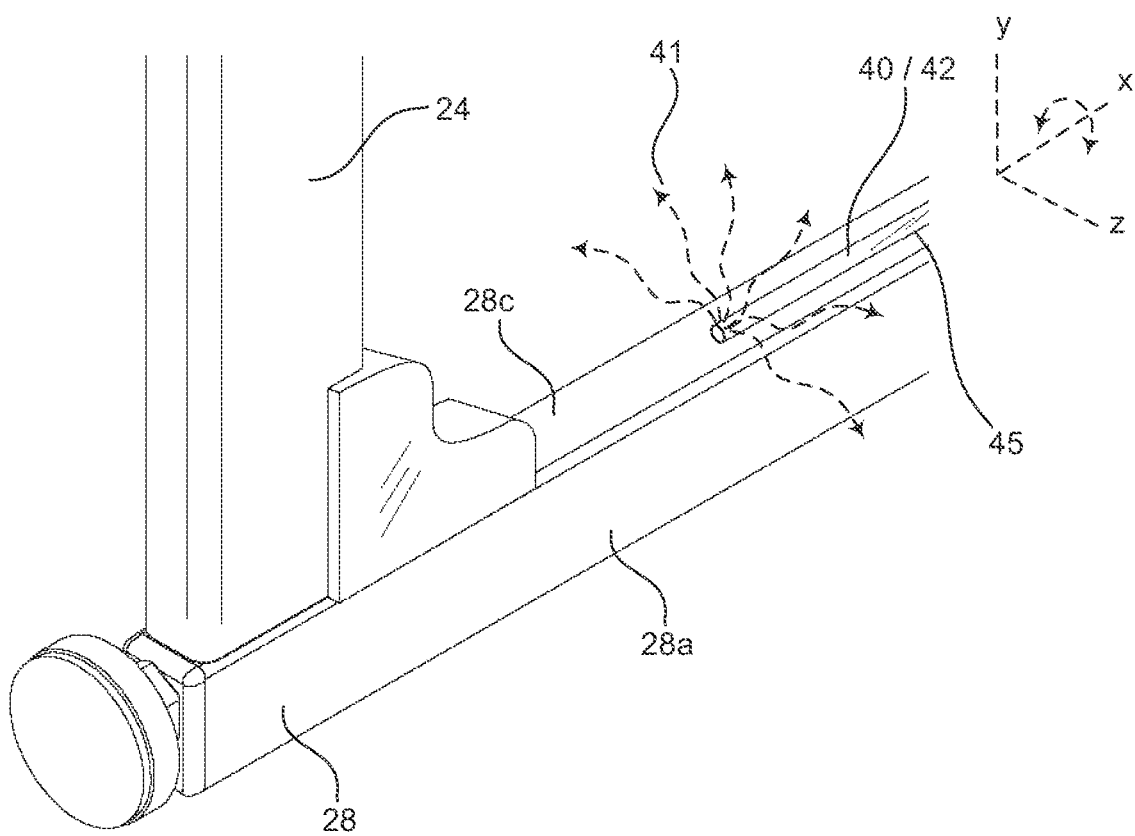
FIG. 9 is a close-up view of an end of an illumination source in a lower cross member.
Figure 10:
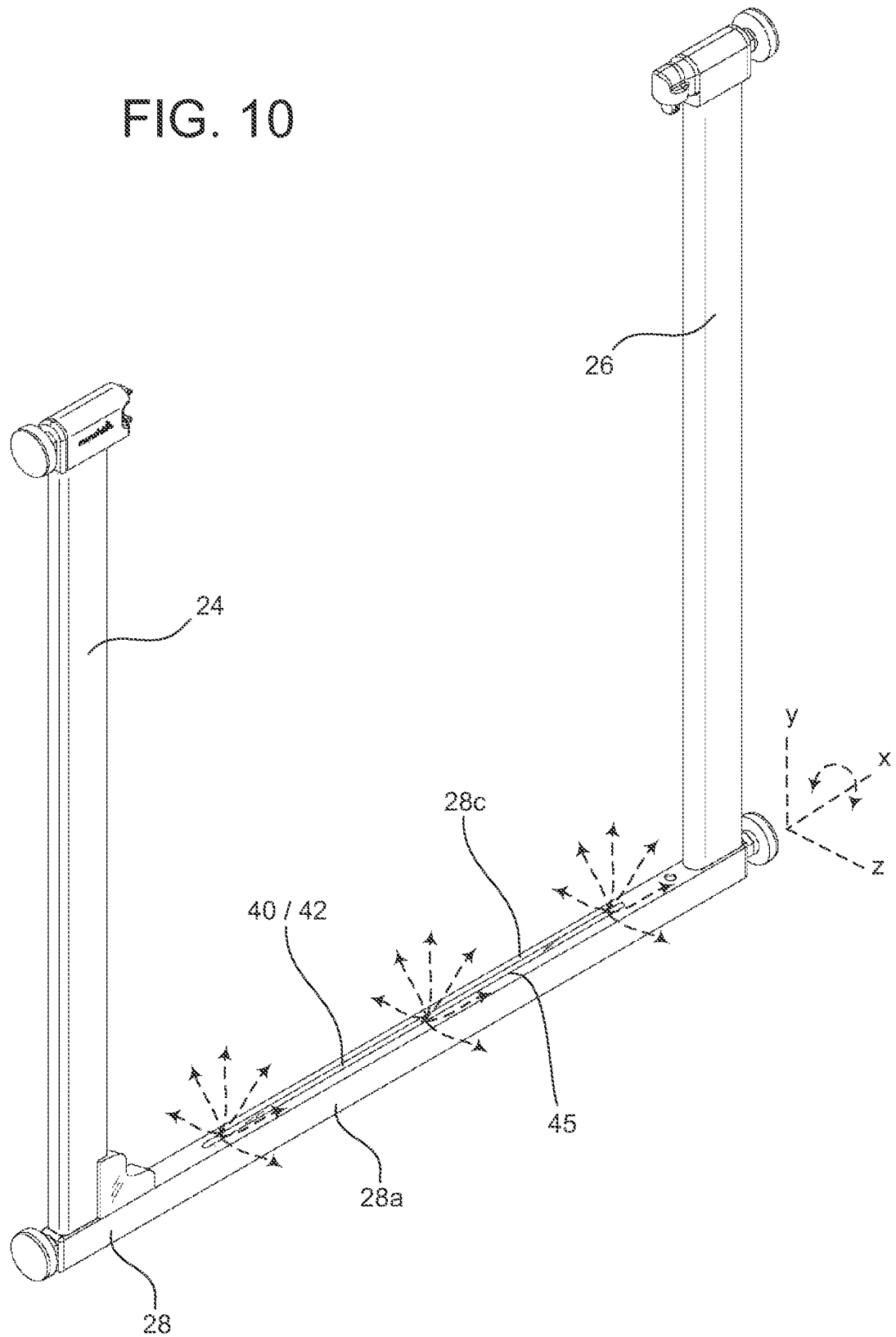
FIG. 10 is a perspective view of an illumination source in a lower cross member illuminating in a pattern radial to the length of the lower cross member.

FIGS. 8-10 are views of an embodiment in which the illumination system 40 is provided on a top (upward-facing) surface 28c of the lower cross member 28. As shown in the top view in FIG. 8, the light flow path 41 pattern emanates approximately 180 degrees in a radial pattern, where the arc of illumination ranges from a front surface 28a of the lower cross member to a rear surface 28b of the lower cross member 28 of the barrier 10. Based on the construction of the elongated illumination element 42, the radial light flow path 41 pattern is adapted to emanate away from the illumination element 42 outward in a direction that substantially encircles the X-axis (that extends along the lower cross member 28), illuminating the lower surface 4 or any the illumination element 42 is positioned near.

FIGS. 8-10 depict the illumination element 42 radiating the light flow path 41 emanating from the light source in the approximately 180 degrees radial direction from the top surface 28c of the lower cross member 28. To achieve the radial illumination pattern, the illumination element 42 may have a curved upper surface construction designed to refract the light generated on the illumination element 42 at various angles in order to cause the light to change direction as it passes through the illumination element 42. It is to be understood that the illumination element 42 may conform to substantially any of a variety of different sizes and or shapes in order to achieve a substantially radial illumination pattern that provides illumination to both the area in front of and the area behind the barrier 10.

Figure 17:
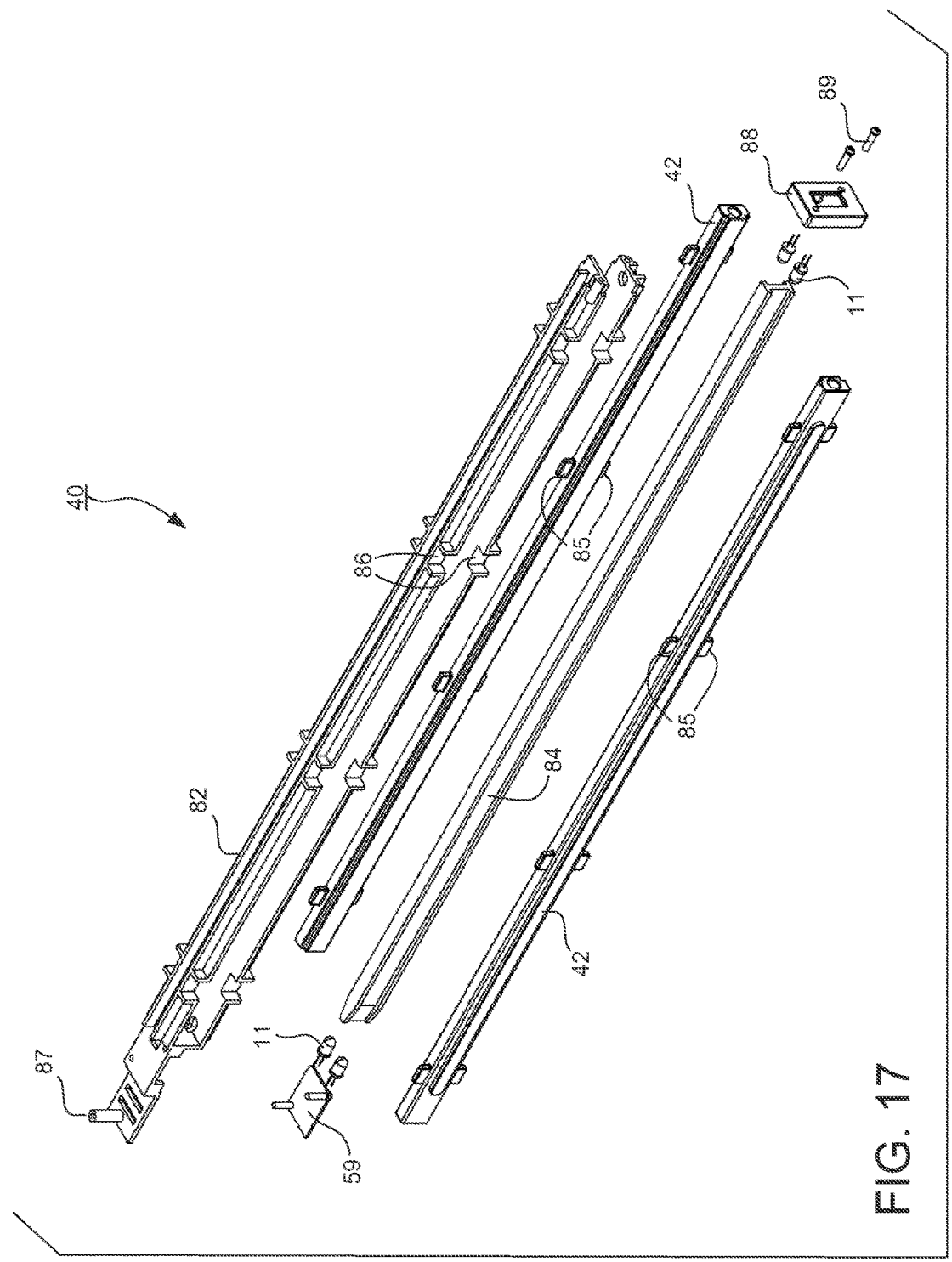
FIG. 17 is an exploded view of the assembly that fits inside the lower cross member.

In one or more embodiments, the illumination element 42 may be embodied as an elongation illumination element, light tube, or light pipe. The shape of the illumination element 42 (such as shown in FIG. 17) is constructed to transport, diffuse, and/or distribute light (such as light from light source 11 in FIG. 17) for illumination. The tube or pipe shape of the illumination element 42 functions as an optical waveguide to reflect light generated by light source 11 in various directions. The illumination element 42 may be embodied as a hollow structure that contains the light with a reflective lining, or transparent solids that contain the light by internal reflection. The light pipe or light tube shape of the illumination element 42 transports the light from light source 11 to another location, minimizing the loss of light. Likewise, illumination element 42 distributes the light over its length, either for equidistribution along the entire length or for controlled light leakage. For example, as in the example embodiments depicted in FIGS. 1-5 and 13-17, the illumination element 42 may provide for equidistribution of light from the light source 11 along the entire length of the illumination element 42. Alternatively, in the example embodiment depicted in FIGS. 6-7, the illumination element 42 may provide for a controlled directed light source 11 through the illumination apertures 45 disposed in the upper cross member 20.

Figure 11A:
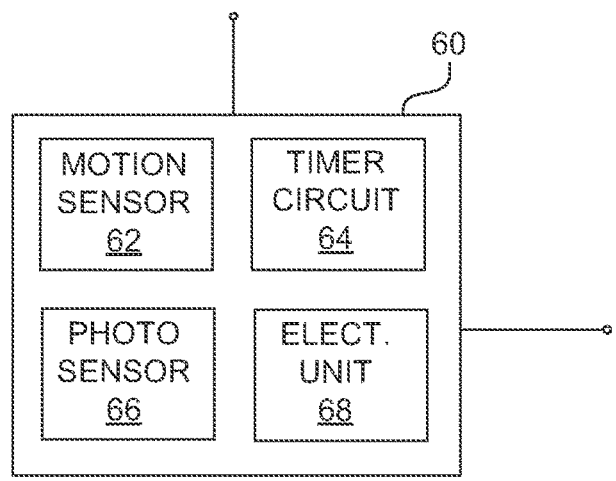
FIG. 11A is a diagram illustrating various electronic components that may be installed in the illuminated barrier.
Figure 11B:
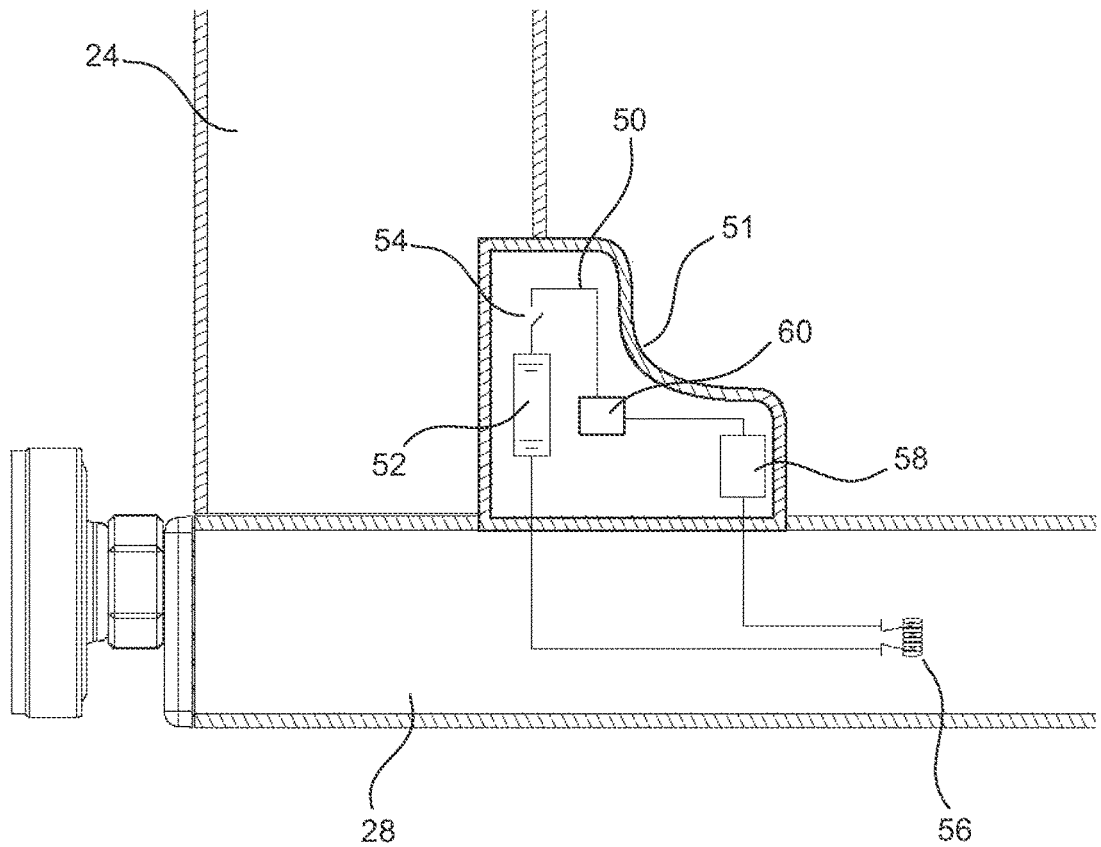
FIG. 11B is a schematic circuit for the illumination source in the illuminated barrier.

FIGS. 11A and 11B illustrate a general schematic of an electronic circuit 50 and electronic components embodied within the illumination system 40. The circuit 50 may be partially or completely contained within a circuit housing 51. The circuit 50 may include at least a power supply source 52, an illumination source 56 and a switch 54 operable to turn the illumination source 56 on and off. Various other electronic components 60 may be included in the circuit 50.

The circuit 50 may include additional components to enhance the processing capabilities of the circuit, such as memory and an electronic control unit (ECU) with a processor. The processing capabilities of the circuit 50 allow the circuit 50 to perform new and/or different operational sequences that may be accomplished by the illumination system 40 in accordance with various operational parameters while in use. Other, additional electronic components 60 may be included in the circuit 50, including but not limited to: a motion sensor, a photo sensor, a timer, and an electronic control unit (ECU) for processing capabilities.

Figure 14:
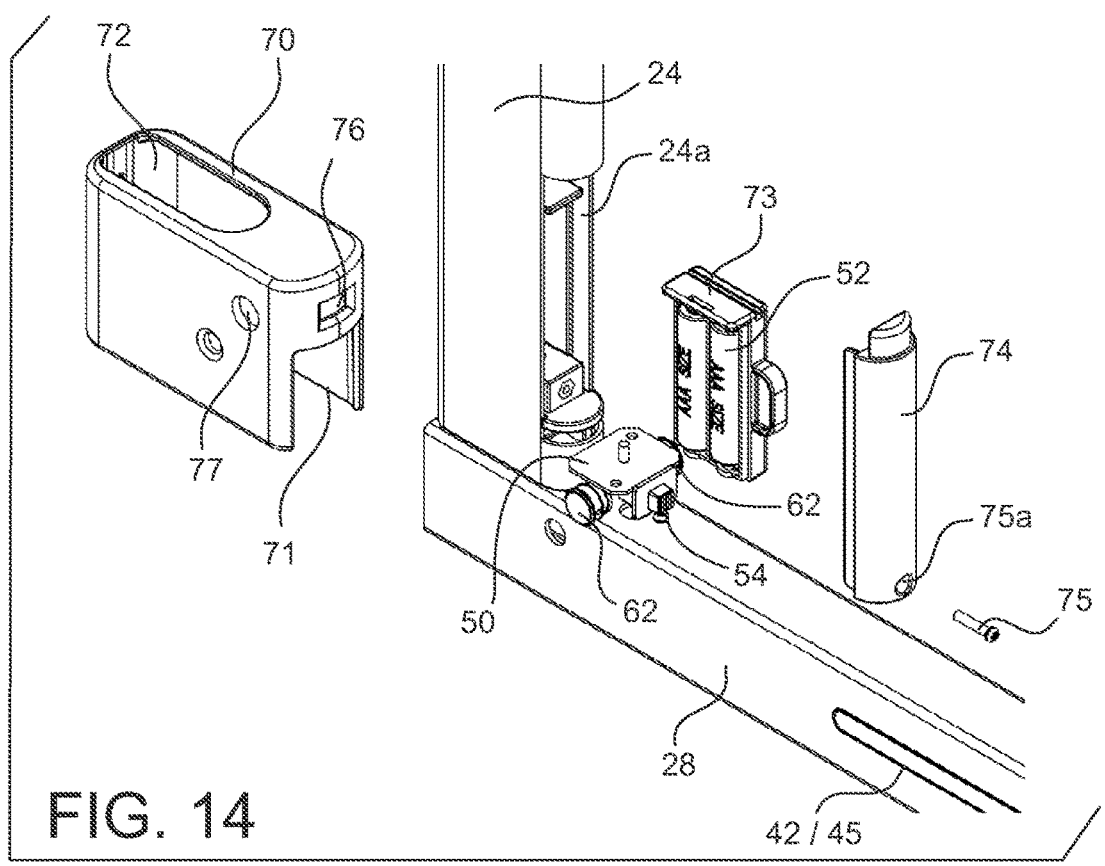
FIG. 14 is an exploded view of the electronic control housing.

The power supply source 52 may be embodied as a battery pack. The battery pack may comprise rechargeable batteries, replaceable disposable batteries, or other suitable power source according to this disclosure. The power supply source 52 may be housed within the circuit housing 51 and may use a battery cartridge tray 73 (as shown in FIG. 14) for proper placement and alignment within the circuit housing 51. The power supply source 52 connects to the illumination source 56 through the switch 54.

Switch 54 is configured to turn the illumination source 56 on while in the closed position, and to turn the illumination source 56 off while in the opened position. That is, switch 54 is the electronic component or device that switches the electrical circuit 50 on and off by interrupting the current or diverting it from one conductor to another. The switch 54 provides active power from the power supply source 52 to the illumination source 56. The switch 54 may be embodied as a button, a slide switch, a pair of magnets, or another suitable sensing element.

In an example embodiment, the switch 54 may be integrated into a latching element coupled between the frame 14 and the door 12, such as in the locking handle 30 as shown in FIG. 7. That is, a frame catch mechanism 39 may be provided on the frame 14. A barrier latch element 33 may also be provided on the barrier 12 to secure the barrier 12 to the frame 14. When the barrier latch element 33 is disconnected from the frame catch mechanism 39, a proximally located switch 54 can be activated to close the circuit 50 and illuminate the illumination source(s) 56 for a predetermined time period so that the illuminated barrier 10 can illuminate the darkened area surrounding the barrier 10. It is to be understood that the switch 54 can be located adjacent to the illumination source 56 or remote therefrom in the circuit 50 disposed within the barrier 10.

Figure 12:
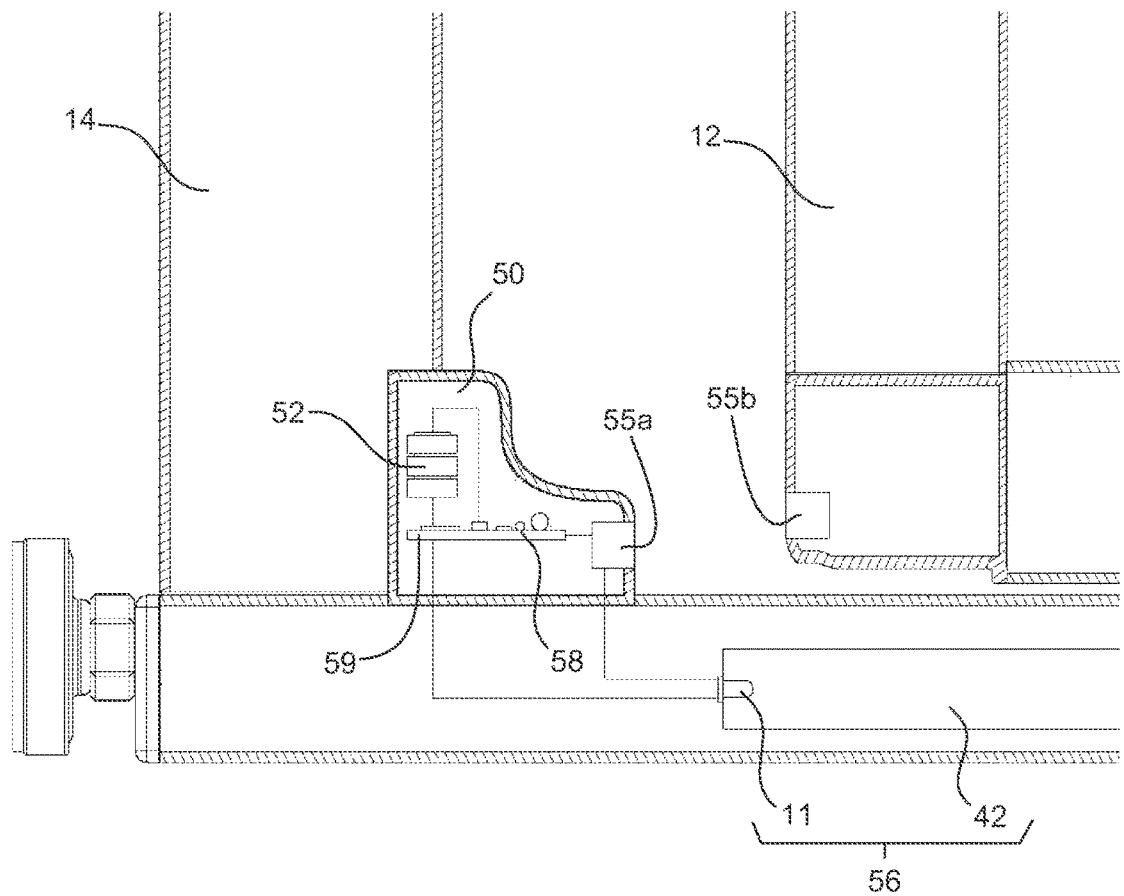
FIG. 12 is another schematic circuit for the illumination source in the illuminated barrier.

FIG. 12 illustrates another example embodiment in which a switch mechanism is embodied as a pair of magnets 55*a*, 55*b* attached to the illuminated barrier 10. A first magnet 55*a* may be attached to the frame 14 of the barrier 10, and a second magnet 55*b* may be attached to the barrier door 12. When the barrier door 12 is opened, and a predetermined opening distance is sensed between the second magnet 55*b* and the first magnet 55*a*, the illumination source 56 may be activated and turned on. That is, when the barrier door 12 swings open away from the frame 14, the circuit 50 is closed and the illumination source 56 turned on for a predetermined period of time or other parameter set by a routine in the controller 58.

The illumination source 56 may be embodied in a variety of different configurations. One such embodiment for the illumination source 56 may be the light-conducting tube-shaped illumination element 42 (such as shown in FIGS. 6-7), which transmits light from a light source 11 such as one or more light emitting diodes (LEDs). Alternatively, the illumination source 56 may be a series of LEDs which are illuminated under the control of a switch 54 activated by the controller 58. In various embodiments, the series of LEDs may be controlled collectively by controller 58, or may be controlled individually by controller 58 in order to generate asynchronous or sequential illumination patterns corresponding to different detected conditions. For example, in the example configuration depicted in FIG. 7, in which the illumination system comprises bulb elements 44 that project light downward from the downward-facing surface of upper cross member 20, each bulb element 44 may have disposed therein, as the illumination source 56, an independently controlled LED or other type of light source. Alternatively, the illumination element may comprise a single illumination source 56 that emits light that is projected across the length of the illumination element and directed downward through the apertures 45. It is to be appreciated that illumination source 56 may comprise any suitable light without departing from the scope of one or more embodiments of this disclosure.

As shown in FIG. 7, a plurality of illumination apertures 45 may be disposed in the downward-facing surface of upper cross member 20 at various intervals along a predetermined distance on the upper cross member 20, such that light from illumination source 56 is disposed through and emanates from the apertures 45. The light-conducting tube-shaped illumination element 42 may be attached along a peripheral edge of the upper cross member 20 by means of an adhesive, a fixing screw, or other fastening mechanism so that the illumination source 56 of the illumination element 42 is located in the aperture 45.

As shown in FIGS. 11-12, an electronic control unit (ECU) or controller 58 may be connected for controlling the on and off power to the illumination element 42. That is, when the illumination element 42 is powered on, the illumination source 56 is turned on and light from the illumination source 56 is radiated through the aperture(s) 45 illuminating the areas surrounding the aperture 45 and the illumination barrier 10.

In one or more embodiments, the illumination element 42 may comprise a flexible transparent tube and at least one light emitting illumination source 56, such as an LED that diffuses light through the illumination element 42, as shown in FIG. 7. An end of the illumination element 42 or illumination source 56 may be electrically connected to the controller 58 that controls the operation of the illumination source 56.

In one or more embodiments, the controller 58 may be configured to control the illumination element 42 to produce various different light colors and illumination patterns in response to detection of various environmental or operational conditions. The different colors and/or patterns may be controlled to represent different conditions sensed by various electronic components 60, which sense and/or detect various conditions or parameters during the operation of the illuminated barrier 10. In response to the various conditions being sensed and detected, the controller 58 can then provide various instructions and/or routines for controlling the illumination barrier 10 based on the sensed conditions.

The controller 58 or processor within the circuit 50 is a comparative device that receives an input electrical signal from at least one of the electronic components 60 in the circuit 50, compares a value represented by the signal with that of a predetermined control point value (set point), and determines an appropriate output signal instruction required within a control routine. The controller 58 is electronically connected to a memory into which various types of data information is stored. Various routines may be stored in the memory adapted for a variety of different uses and/or sequences based on the various signal inputs received by the controller 58 from the various electronic components 60 in the circuit.

In an example embodiment, the controller 58 may instruct the illumination source 56 to remain illuminated continuously so long as the circuit is closed and no special conditions are detected. In response to detection of a defined condition, such as detection of an object within the vicinity of the barrier 10 (suggesting that a child or pet is near the illuminated barrier), the controller 58 may send control the illumination source 56 to sequentially flash at a defined periodicity. The controller 58 may store and execute a variety of different routines for controlling the illumination source 56. The controller 58 may include a simple electronic light circuit, or it may include a preselected program (or plurality of routine programs) for flashing the illumination source 56. For example, in embodiments in which a separate illumination source 56 is disposed near each aperture 45 in the downward-facing surface 20b of the upper barrier member 20 (as shown in FIG. 7), the controller 58 can include a program for flashing the illumination sources asynchronously, a program for flashing the illumination sources synchronously, a program for flashing the illumination sources sequentially, and so forth. The controller 58 may instruct the LEDs to emit light continuously (or to remain non-illuminated) during normal conditions, and to flash in a sequential or asynchronous manner in response to detection of an object in proximity to the barrier 10. The routine programs can be stored and retrieved from memory by the controller 58 as required in response to detection of the defined conditions, or the controller 58 may be selectively programmable by the user.

FIGS. 11 and 11A depict various electronic components 60 that may be included in the electronic circuit 50 according to one or more embodiments. For example, the electronic components 60 may include a motion sensor 62, a timer control circuit 64, a photo sensor 66 and/or any other electronic unit 68 as part of the electronic circuit 50.

The motion sensor 62 may be configured to detect moving objects in proximity of the illuminated barrier 10, including but not limited to people. Integrated as part of the circuit 50, the motion sensor 62 may be configured to automatically sense movement within a predetermined area or distance around the motion sensor 62. In response to receipt of a signal from the motion sensor 62 indicating presence of an object near the illuminated barrier 10, the controller 58 can close the switch 54 and turn on the illumination source 56, thereby alerting an approaching person of the presence of the barrier.

The motion sensor 62 may be used to monitor a predetermined area. In one or more embodiments, the motion sensor 62 may not be dependent on the position of the barrier 12 relative to the frame 14 of the barrier 10. Thus, the motion sensor 62 may be adapted to detect a person in the motion-detection zone regardless of whether the barrier 12 is in an opened or closed position. In other embodiments, the controller 58 may be configured to ignore signals from motion sensor 62 while the barrier gate is in the opened position, such that motion-activated illumination of the barrier 10 is only performed while the barrier is in the closed position. In one or more embodiments, the motion sensor 62 can be adapted to work in combination with a photo sensor 66 that measures a darkness condition based on a measured amount of light in the area surrounding the barrier 10. The level of measured ambient light or ambient darkness that triggers illumination of the barrier 10 can be a predetermined setting entered by the user as a parameter provided to the photo sensor 66. That is, the user can adjust the degree of sensitivity of the photo sensor 66. In an example operating routine, the controller 58 may be configured to activate illumination of the barrier 10 if both an object detection condition and an ambient darkness level condition are satisfied simultaneously. For example, the controller 58 may illuminate the barrier 10 if an object is detected near the barrier (as determined by the motion sensor 62) while the measured amount of ambient light near the barrier 10 is below a defined threshold (as determined by the photo sensor 66).

A timer control circuit 64 can be provided to cause the controller 58 to activate and deactivate illumination of the barrier 10 in accordance with a predetermined time threshold. In such embodiments, the system may allow the user to define a time frame for which the illumination source 56 will be active. In accordance with this configuration, the controller 58 will activate the illumination source 56 during the prescribed time range, and deactivate the illumination source 56 at other times.

The timer control circuit 64 can measure various time intervals based on a particular routine application. In one or more embodiments, the timer control circuit 64 can operate in conjunction with the motion sensor 62. For example, the motion sensor 62 may detect an object presence near the barrier 10, and cause the illumination source 56 to activate. After the object is no longer detected, the timer control circuit 64 may be set to open the circuit 50 and turn off the light after a period of time has elapsed since detecting the absence of the object. The timer control circuit 64 may be used to sequentially turn the illumination source 56 on and off at predetermined intervals.

The motion sensor 62 may be configured to detect the distance, absence, or presence of an object by using a light transmitter (e.g., an infrared transmitter), and a photoelectric receiver. Various types of sensors may be employed for this purpose, including but not limited to an opposed (through beam) photo sensor, a retro-reflective sensor, or a proximity-sensing (diffused) sensor. In response to detecting presence of an object, the motion sensor 62 sends a signal to the controller 58 to close the switch 54 and turn on the illumination source 56. As in previously described examples, the timer control circuit 64 can be used to control the duration for which the illumination source 56 remains illuminated.

The illumination system 40 can be constructed of a plurality of component parts. The illumination system 40 can also be constructed as a self-contained unit adapted to fit within one of the various structural components of the illuminated barrier 10, such as the outer vertical frame member 24, 26, the upper or lower cross members 20, 28, or the vertical barrier members 23. As a self contained unit, the various components of the illumination system 40 may be constructed as a single replaceable unit.

Figure 13:
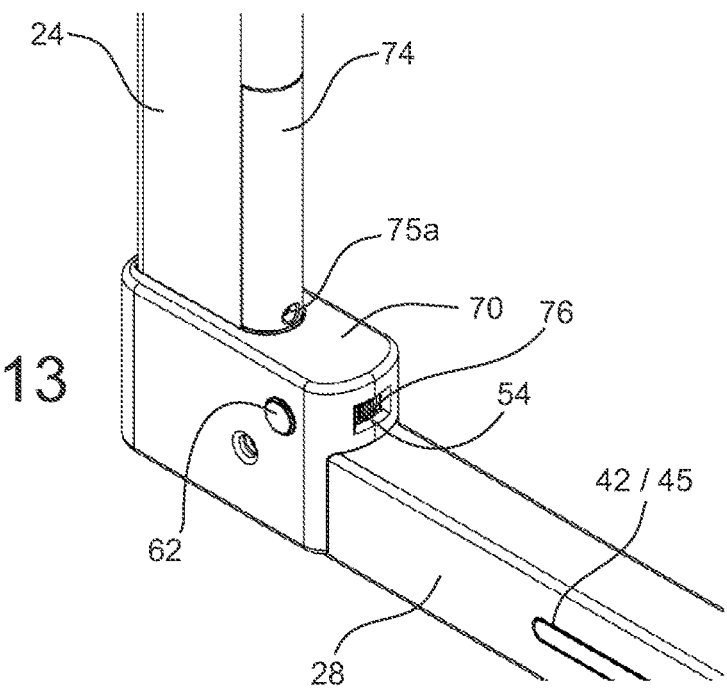
FIG. 13 is a close-up view of an electronic control housing for the illuminated barrier.

FIGS. 13-17 show the illumination system 40 and its electronic circuit 50 embodied within the upwardly extending arm 24 and the lower cross member 28 that has an illumination aperture 45 disposed therein. As shown in FIGS. 13 and 14, an electronic control housing 70 is disposed between the upwardly extending arm 24 and the lower cross member 28. The electronic control housing 70 includes a first opening 71 into which the lower cross member 28 is disposed. The electronic control housing 70 also includes a second opening 72 into which the upwardly extending arm 24 is disposed. A switch opening 76 is provided to allow access to the on/off switch 54. A sensor opening 77 is provided to receive the motion sensor 62 disposed therein.

FIG. 14 illustrates an exploded view of the illumination system 40 and its electronic circuit 50 embodied within the upwardly extending arm 24 and the lower cross member 28. A battery housing door 74 having a fastener 75 is adapted to attach to the upwardly extending arm 24. A cartridge tray 73 is disposed inside a battery compartment 24*a* located on the upwardly extending arm 24. The cartridge tray 73 can be removed from the battery compartment 24*a* so that a power supply source 52, such as one or more batteries, can be installed or removed. Once the power supply source 52 (e.g., batteries) have been installed in the cartridge tray 73, the cartridge tray 73 can be reinstalled in the battery compartment 24*a*, and the battery housing door 74 can be affixed over the compartment 24*a* (e.g., using fastener 75). FIG. 13 illustrates the assembled system.

FIGS. 15-17 illustrate components that make up the lower cross member 28 for embodiments in which illumination system 40 is installed in the lower cross member 28. As shown in FIG. 15, the outer housing of lower cross member 28 includes apertures 45 on the front and rear surface (only the front aperture 45 is shown in FIG. 15) to allow corresponding illumination elements 42 mounted on the front and rear sides of a container support 80 (see FIG. 16) to project light outward from the lower cross member 28 through the apertures 45. Container support 80 can be slid into the outer housing of the lower cross member 28 through an opening 90 in an end of the housing. Once the container support is fulling installed within the lower cross member 28 housing, the illumination element 42 substantially align with their corresponding apertures 45. Alignment channel 87 on the container support 80 mates with alignment hole 83 in the housing of the lower cross member to secure and align the container support 80 in the proper location within the lower cross member 28. Electrical wiring can be passed into the lower cross member housing through hole 81.

FIG. 17 is an exploded view of the illumination system 40 showing the component parts in more detail. As shown in this figure, the illumination elements 42 that will project light through the front and rear sides of lower cross member 28 are installed on respective sides of an internal divider 84. The internal divider 84 fits within a guide 82, and the illumination elements 42 are installed on the respective sides of the internal divider. The illumination elements 42 include alignment tabs 85 that mate with alignment channels 86 on the guide 82, ensuring proper alignment of the illumination elements 42 within the guide 82 and preventing the alignment channels 86 from sliding out of the guide.

Two light sources 11 are mounted on a printed circuit board 59, which includes at least some of the circuit elements of circuit 50 required to control the light sources 11. The light sources 11 are inserted into holes at the end of each of the illumination elements 42, such that light from the light sources 11 will be projected through the illumination elements 42.

Once these elements are assembled, an alignment cap 88 is attached to the end of the assembly and fixed in place with fasteners 89. The completed assembly can then be installed in the housing of the lower cross member 28, as described above in connection with FIGS. 15 and 16.

As employed in this specification and annexed drawings, the term "or" is intended to mean an inclusive "or" rather than an exclusive "or." Moreover, articles "a" and "an" as used in the subject specification and annexed drawings should generally be construed to mean "one or more" unless specified otherwise or clear from context to be directed to a singular form.

What has been described above includes examples of a low-profile assembly and method of installation that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a barrier frame having at least one upright frame member and a lower cross member, the at least one upright frame member connected to the lower cross member;
    a barrier door having an upper horizontal cross member, a lower horizontal cross member, and vertical members disposed between the upper horizontal cross member and the lower horizontal cross member, wherein the barrier door is pivotally connected to one of the at least one upright frame member;
    an illumination source disposed in the lower cross member and emitting a light in front of and behind the lower cross member; and
    a controller configured to control illumination of the illumination source.

2. The system of claim 1, further comprising a second illumination source defined in a plane defined by the lower cross member.

3. The system of claim 1, further comprising a second illumination source, wherein the illumination source comprises at least a first elongated illumination element disposed on a front-facing surface of the lower cross member and the second illumination source comprises at least a second elongated illumination element disposed on a rear-facing surface of the lower cross member.

4. The system of claim 1, wherein the illumination source comprises an elongated illumination element disposed on an upward-facing surface of the lower cross member.

5. The system of claim 4, wherein the elongated illumination element comprises a light tube that emits a substantially radial illumination patterns.

6. The system of claim 1, furthering comprising at least another illumination source disposed on a downward-facing surface of the upper horizontal cross member.

7. The system of claim 6, wherein the downward-facing surface comprises apertures disposed between adjacent vertical members of the vertical members, and the illumination source comprises an elongated illumination element disposed within the upper horizontal cross member, the elongated illumination element comprising bulb elements that project through the apertures.

8. The system of claim 1, further comprising at least another illumination source disposed on at least one of the vertical members.

9. The system of claim 1, wherein the controller is configured to change at least one of an illumination color or an illumination pattern of the illumination source in response to detection of a defined condition.

10. The system of claim 9, wherein the defined condition comprises at least one of presence of an object within a proximity of the barrier frame, a determination that an amount of ambient light within the proximity of the barrier frame satisfies a criterion, or a determination that a current time corresponds to a defined time range.

11. A barrier, comprising:
- a lower cross member defining a plane;
- an upright frame member connected to a first end of the lower cross member;
- an upper horizontal cross member pivotally attached to the upright frame member;
- a set of vertical members attached to a downward-facing surface of the upper horizontal cross member;
- a lower horizontal cross member attached to bottom ends of the set of vertical members;
- at least one illumination source installed along the plane in the lower cross member and emitting light in front of and behind the lower cross member;
- a second illumination source installed along the plane in the lower cross member; and
- a controller configured to control illumination of the illumination source.

12. The system of claim 11, wherein one of the two illumination sources emits light in front of the lower cross member and the other of the two illuminations sources emits light behind the lower cross member.

13. The barrier of claim 11, wherein the at least one illumination source comprises at least a first elongated illumination that faces through an aperture on a front-facing surface of the lower cross member and the second illumination source comprises at least a second elongated illumination element that faces through a second aperture on a rear-facing surface of the lower cross member.

14. The barrier of claim 11, wherein the at least one illumination source comprises an elongated illumination element located on an upward-facing surface of the lower cross member.

15. The barrier of claim 14, wherein the elongated illumination element comprises a light pipe configured to emit light in a substantially radial pattern.

16. The barrier of claim 11, wherein a downward-facing surface of the upper horizontal cross member comprises apertures, and at least another illumination source comprises an elongated illumination element located in the upper horizontal cross member and oriented to emit light downward through the apertures.

17. The barrier of claim 11, further comprising at least another illumination source comprises at least one elongated illumination element located on at least one of the set of vertical members.

18. The barrier of claim 11, wherein the controller is configured to control at least one of an illumination color or an illumination pattern of the at least one illumination source in accordance with a defined condition detected by at least one of a motion sensor or a photo sensor.

19. A method of manufacturing a safety barrier, comprising:
- connecting an upright frame member to a first end of a lower cross member;
- pivotally attaching an upper horizontal cross member to the upright frame member;
- connecting a set of vertical members to a downward-facing surface of the upper horizontal cross member;
- connecting a lower horizontal cross member to bottom ends of the set of vertical members;
- installing at least one illumination source in the lower cross member such that the illumination source emits light in a plane parallel to from the lower cross member in front of and behind the lower cross member; and
- installing a control circuit in a housing attached to at least one of the lower cross member or the upright frame member, the control circuit configured to control illumination of the at least one illumination source.

20. The method of claim 19, further comprising installing at least one of a motion sensor or a photo sensor,
wherein the installing the control circuit comprises installing a controller configured to alter at least one of an illumination color or an illumination pattern of the at least one illumination source in response to detection of a defined condition by at least one of the motion sensor or the photo sensor.

\* \* \* \* \*